United States Patent [19]
Brandenburg

[11] Patent Number: 5,624,224
[45] Date of Patent: Apr. 29, 1997

[54] HAND TRUCK UNLOADING APPARATUS

[76] Inventor: Thomas L. Brandenburg, 1018 Shawnee Dr., Elizabethtown, Ky. 42701

[21] Appl. No.: 597,662

[22] Filed: Feb. 6, 1996

[51] Int. Cl.$^6$ ........................................ B02B 1/12
[52] U.S. Cl. ..................... 414/490; 414/444; 280/47.27
[58] Field of Search .................... 414/490, 444, 414/446, 451; 280/47.27, 47.28, 47.29; 298/2, 5

[56] References Cited

U.S. PATENT DOCUMENTS

| | | | |
|---|---|---|---|
| 1,542,023 | 6/1925 | Alexander | 414/490 |
| 1,709,737 | 7/1929 | Perry . | |
| 1,710,893 | 4/1929 | Phillips | 414/490 |
| 2,240,355 | 11/1941 | Swimley . | |
| 2,406,158 | 5/1946 | Newport . | |
| 2,476,202 | 7/1949 | Lozou, Sr. . | |
| 2,649,219 | 12/1953 | Nielson . | |
| 2,682,348 | 6/1954 | Stumphauzer . | |
| 3,308,978 | 3/1967 | Smith, Jr. . | |
| 3,403,800 | 10/1968 | Botello | 414/490 |
| 3,712,496 | 1/1973 | Miller | 414/444 X |

FOREIGN PATENT DOCUMENTS 2742101  3/1979  Germany ........................... 414/490

OTHER PUBLICATIONS

Harper Hand Truck Catalogue No. 190, p. 9.

*Primary Examiner*—Frank E. Werner
*Attorney, Agent, or Firm*—Middleton & Reutlinger; David W. Carrithers

[57] ABSTRACT

A hand truck unloading apparatus for use with two wheel hand trucks having a cargo platform at the lower end portion, the cargo being unloaded by unidirectional forward displacement of an unloading device without manual contact of the operator with the load.

18 Claims, 4 Drawing Sheets

HAND TRUCK UNLOADING APPARATUS

BACKGROUND OF THE INVENTION

This invention relates to a hand truck unloading apparatus for use with two wheel hand trucks having a cargo platform at the lower end portion, whereby the cargo is unloaded by unidirectional forward displacement of an unloading means without manual contact of the operator with the load.

Typical two wheel hand trucks have a generally flat cargo platform at the lower end portion for sliding under and supporting cargo such as crates or boxes thereon. It is time consuming and strenuous to off-load the cargo. Often the operator will lift the wheels of the hand truck off of the ground to tilt the lift truck forward to slide the cargo off of the platform. Then the operator will have to wiggle the platform out from under the cargo, remove the hand truck, and reposition the load in a straight, orderly manner. The procedure is unsafe, time consuming and can result in injury to the user from tilting the hand truck or lifting or scooting the cargo.

Foot operated cargo unloading or "kickoff" devices have been developed to unload cargo from the trucks. These devices utilize a lever, fulcrum, or other swinging panel member resting against the hand truck frame which generally rotates around a pivot point swinging outwardly in an arc contacting the cargo or boxes resting on the platform and forcing them forward and upward off of the platform. These conventional "kickoff devices" jar the cargo container and usually results in misplacement of the goods due to the upward misaligning motion of the swinging panel member.

SUMMARY OF THE INVENTION

The present invention is directed to a hand truck unloading apparatus capable of removing cargo such as boxes off of the platform by utilizing a straight forward motion parallel to the surface of the hand cart platform.

The present invention comprise a hand truck unloading apparatus consisting of a hand truck with a frame attached to a wheel assembly. The frame has a pair of side rails connected to a flat platform base extending outwardly normal thereto. An unloading apparatus is connected to the frame. The unloading apparatus comprises a pair of spaced apart support members having a pair of side arms and a pair of leg members extending downwardly normal thereto. A central support depression member connects the side arms. An axle rotatably attached to the frame supports the support members comprising the side arms and legs. A pair of adjustable pivot arms are connected to the support members and a push bar is attached to the adjustable pivot arms.

It is an object of the present invention to use a pair of support members comprising side arms and legs rotating around an axle whereby the legs are rotatably connected to adjustable pivot arms so that the box or cargo is pushed off of the platform in a straight line by a horizontal motion in contrast to the forward/upward motion of conventional devices.

It is another object of the present invention to reduce and/or eliminate strain on the user and cargo.

It is yet another object of the present invention to provide a means for adjusting the pivot arms for adapting the unloader apparatus to almost any type of conventional hand truck so that the push bar extends the exact distance necessary to push the cargo completely off of the platform.

BRIEF DESCRIPTION OF THE DRAWINGS

A better understanding of the present invention will be had upon reference to the following description in conjunction with the accompanying drawings in which like numerals refer to like parts throughout the several views and wherein.

SPECIFICATION

Figure 1:
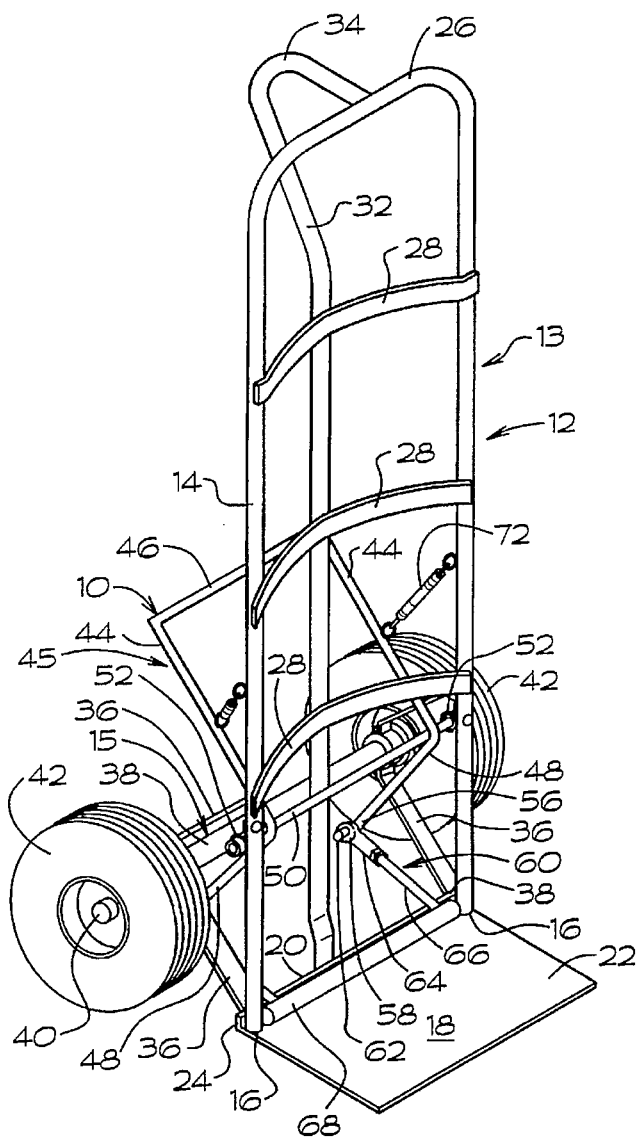
FIG. 1 is a perspective view showing the unloader apparatus of the present invention.
Figure 2:
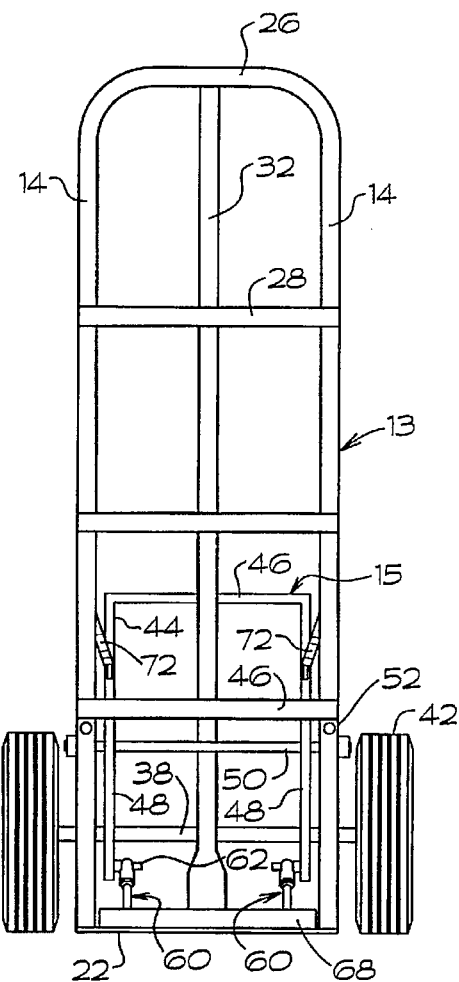
FIG. 2 is a front view of FIG. 1.

The hand truck unloading apparatus of the present invention is manufactured from readily available materials and simple in design. The preferred embodiment is comprised of metal, more particularly aluminum or steel due to its light weight and great structural strength. However, it is contemplated that plastic, such as high density polyethylene, nylon, PVC, a polymer composite containing graphite or aramid fibers, or a fiberglass material could be used in combination with or substituted for the metal components of the present invention.

Referring now to the drawings, FIGS. 1–6 show the hand truck unloading apparatus in a stationary position and in the in-use extended position.

The hand truck unloading apparatus 10 as shown is removably attached to a conventional hand truck 12. A hand truck 12 typically comprises a frame 13 attached to an wheel assembly 15. The frame 13 usually comprises a pair of side rails 14 having their distal ends 16 connected to the top surface 18 one side edge 20 of a generally flat platform base 22 extending outwardly normal thereto. As shown in the preferred embodiment, a portion of the side edge 20 is bent upward perpendicular to the platform surface 18 forming a lip 24 in cooperative engagement with the back of the side rails 14 for increased strength. The opposite ends of the side rails 14 are also connected together at the top by a support holding member, defining a straight member, curved member, or as shown in the preferred embodiment, a continuous "U-shaped" holding support member 26 defining a straight holding member having curved connecting ends. The side rails 14 are also usually connected together by at least one cross member 28. As shown in the preferred embodiment, the cross members 28 are curved outwardly toward the user to cradle or better hold cargo supported by the hand truck 12. A bottom cross member (not shown) comprising a tubular member or strip may be disposed between the distal ends 16 of the side rails 14 in cooperative engagement with the lip 24 of the platform 22 for enhanced strength and rigidity. The hand truck frame 13 of the present invention utilizes a centrally positioned longitudinal vertical support member 32 which forms a hooked curve at the top end connecting to the center of the top support holding member 26 forming a handle 34. Typically, the wheel assembly 15 includes a pair of "V-shaped" axle support members 36 formed of flat or tubular metal connected by their distal ends 38 to the back of the hand truck frame 13 opposite the side of the frame 13 supporting the platform 22. The axle support members 36 are usually bent at about a 90 degree angle in the center and includes a bore therethrough or sleeve 38 welded thereto for cooperative engagement with an axle 40 supporting a pair of wheels 42.

Figure 3:
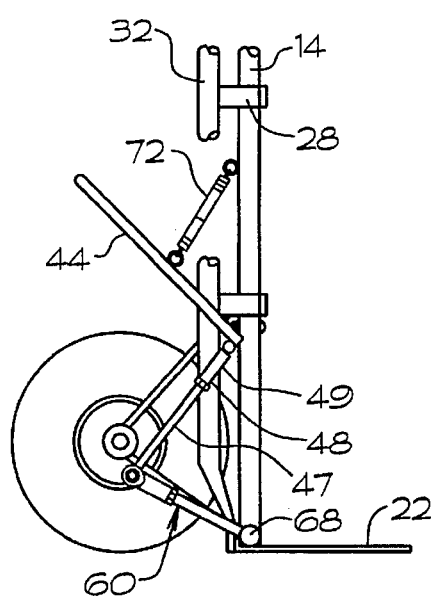
FIG. 3 is a partial cutaway side view showing the unloader apparatus in the resting position.
Figure 4:
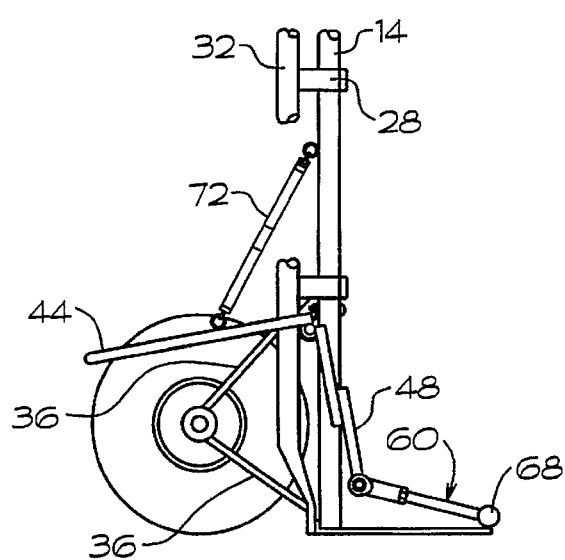
FIG. 4 is a partial cutaway side view of the unloader apparatus in the extended off loading position showing the extending member in alignment with the front edge of the hand truck platform.

The preferred embodiment of the hand truck unloading apparatus 10 comprises a pair of spaced apart support members 45 comprising a pair of parallel side arms 44 and leg members 48, wherein the side arms 44 are connected together by a central support depression member 46 forming a pedal. The lower portion of the side arms 44 are bent or curved downward at about a ninety degree angle forming a pair of leg members 48. As shown in FIG. 1 the leg members 48 consist of a single rod, as shown in FIG. 3, the leg members 48 are shown as having a threaded male rod portion 47 threadably connected to an threaded female rod portion 49 for cooperative engagement with the male threaded end, and as shown in FIG. 4, two rods are secured together such as by welding. It is contemplated that the side arms 44 may also comprise an adjustable rod member. An rod or shaft forming an axle 50 is attached normal to the side arms 44 at the point of the curve and rotatably secured to the side rails 14 of the frame 13 by a means for holding 52 such as tubular sleeves or bearings which may be held in place by clamps 54. An alternate means for holding includes boring holes though the side rails 14 and inserting the axle 50 therethrough.

Figure 5:
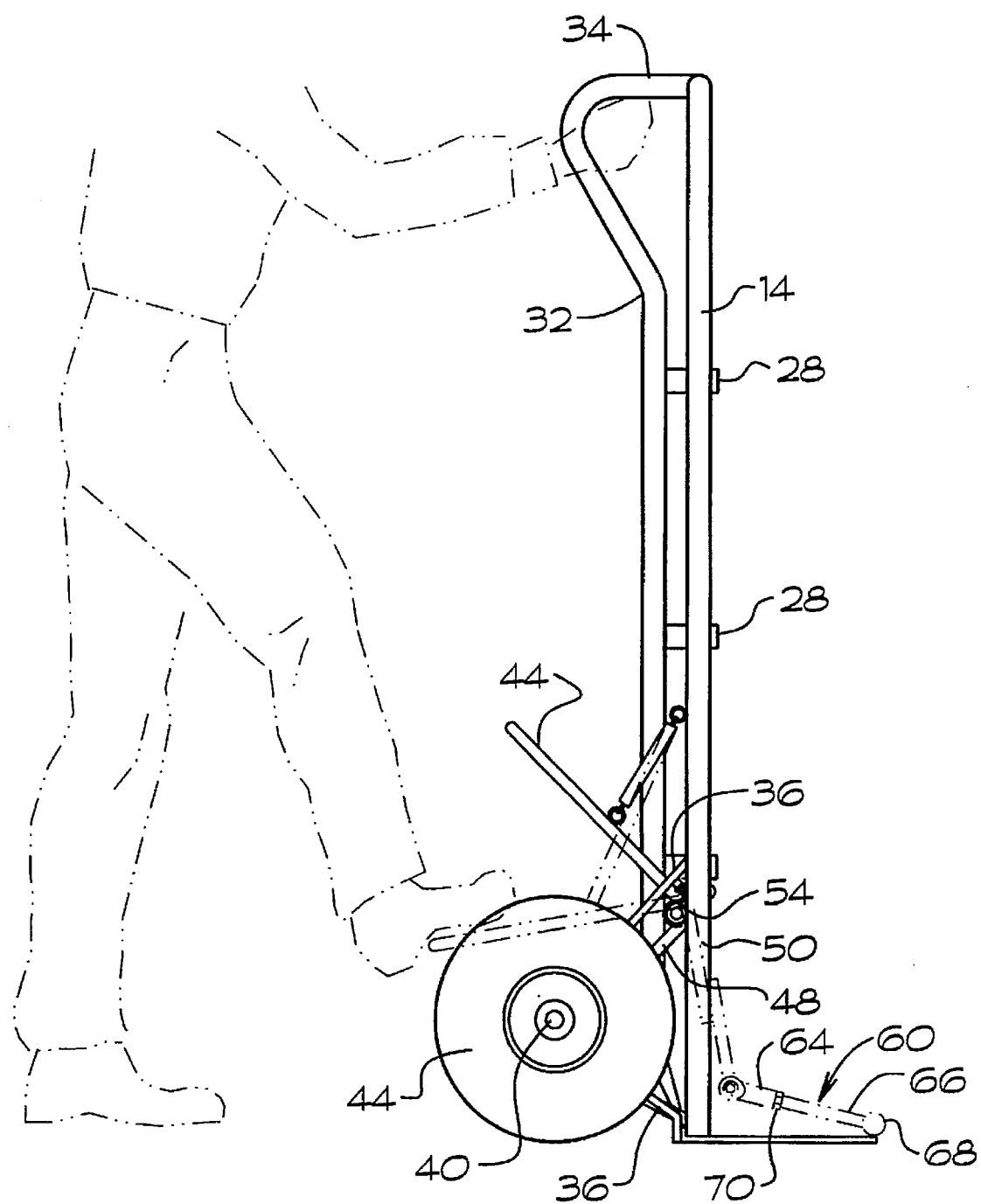
FIG. 5 is a side view showing the hand truck and unloader apparatus in the resting position and showing the operator and apparatus in the extended position in phantom lines.
Figure 6:
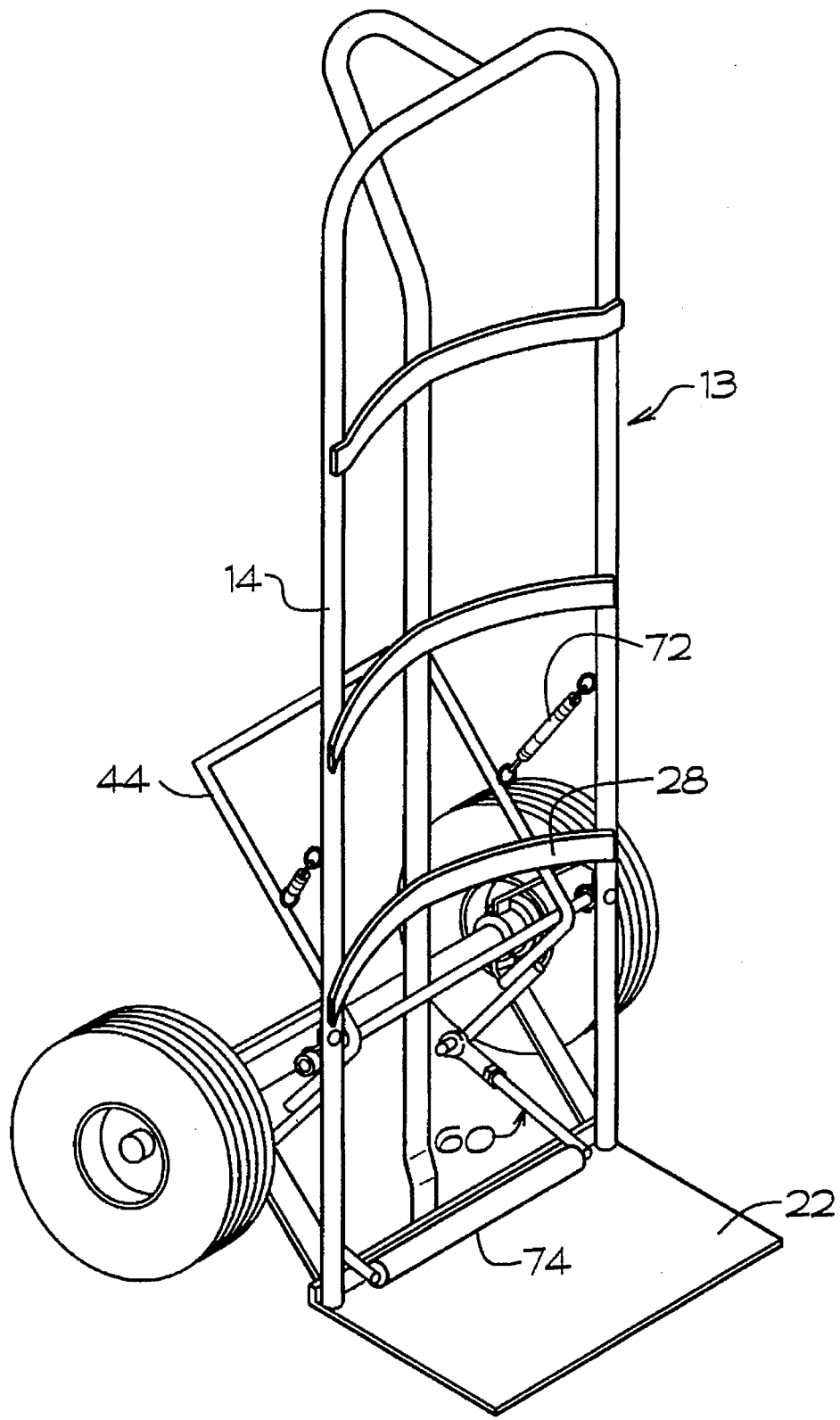
FIG. 6 is a perspective view showing the hand truck and unloader apparatus utilizing a push roller.

The distal ends 56 of the leg members 48 are formed having a hole 50 therethrough for cooperative engagement with the distal ends 58 of the pivot arms 60 and secured thereto by a fastening means such as a pin 62. The pivot arms 60 consist of a female pivot arm member 64 having a threaded throughbore through the distal end thereof threadably engaging a threaded distal end of a male pivot arm member 66 which is attached to a push rod or bar 68. A nut 70 threadably engaging the threaded portion of the male pivot arm member 66 may be rotated to adjust the length of the pivot arms 60 to extend the desired distance away from the frame 13 when extended. As shown in FIG. 5, a push roller 74 may be substituted for the push rod 68.

To use the unloading apparatus 10, the user merely depresses the central support 46 with his foot causing the legs 48 to rotate around the axle 50 and move the pivot arms 60 forward thereby moving the push rod 68 and outwardly forcing the cargo off of the platform 22. A biasing means such as a spring 72 is attached to at least one of the side arms 44 and a selected side rail 14 to pull the push rod 68 or push roller 74 back into the stationary/storage position for transporting cargo.

It is contemplated that the present invention may also utilize only 1 support member 45 comprising a single side arm 44 and single leg member 48 connected to a single pivot arm 60 connected to the push bar 68 or roller 74.

An improvement to the present invention not utilized in conventional unloading apparatus is the combination of the side arms 44 and legs 48 rotating around an axle 50, whereby the legs are rotatably connected to adjustable pivot arms 60 so that the box or cargo is pushed off of the platform in a straight line by a horizontal motion in contrast to the forward/upward motion of conventional devices. The present invention eliminates strain on the user and cargo. Moreover, the adjustment of the pivot arms 60 provide a means for adapting the unloader apparatus 10 to almost any type of conventional hand truck 12 so that the push bar 68 extends the exact distance necessary to push the cargo completely off of the platform 22.

It is also contemplated that the side arms 44 may be extended upward at a lesser angle in order to use the hands to push the cargo off of the platform; however, it is advantageous for the side arms not to extend outwardly behind the frame 13 further than the wheels 42 so as to not interfere with the locomotion of the user.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A hand truck unloading apparatus, for a hand truck having a frame attached to a wheel assembly, said frame having a pair of side rails connected to a platform base extending outwardly normal thereto, said hand truck unloading apparatus, comprising:

a pair of spaced apart support members comprising a pair of side arms and a pair of leg members extending downwardly normal thereto;

a central support depression member connecting said side arms;

an axle rotatably supporting said support members said axle being attached to said frame;

a pair of adjustable pivot arms connecting to said support members for adjusting the length of said pivot arms a selected distance of travel, wherein said pair of adjustable pivot arms are substantially normal to a lower and of said leg members through a range of motion; and means for pushing attached to said adjustable pivot arms, wherein said means for pushing extends outwardly in a straight forward motion parallel to said platform base.

2. The hand truck unloading apparatus of claim 1, wherein said means for pushing is a bar.

3. The hand truck unloading apparatus of claim 1, wherein said means for pushing is a roller.

4. The hand truck unloading apparatus of claim 1, wherein said leg members are adjustable in length.

5. The hand truck unloading apparatus of claim 1, wherein said side arms are adjustable in length.

6. The hand truck unloading apparatus of claim 1, including a means for biasing said unloading apparatus in a stationary position.

7. The hand truck unloading apparatus of claim 6, wherein said means for biasing is a spring attaching said support member to said side rail.

8. The hand truck unloading apparatus of claim 1, wherein said side arm and said leg members are integral.

9. The hand truck unloading apparatus of claim 1, wherein said central support depression member extends less away from said frame less distance than said wheel assembly.

10. A hand truck unloading apparatus, for a hand truck having a frame attached to a wheel assembly, said frame having a pair of side rails connected to a platform base extending outwardly normal thereto, said hand truck unloading apparatus, comprising:

at least one support member comprising at least one side arm and at least one leg member extending downwardly normal thereto;

a central support depression member connecting said at least one side arm;

an axle rotatably supporting said at least one support member said axle being attached to said frame;

at least one adjustable pivot arm connecting to said at least one support member for adjusting the length of said at least one adjustable pivot arm a selected distance of travel, wherein said at least one adjustable pivot arm is substantially normal to a lower end of said at least one leg member through a range of motion; and means for pushing attached to said at least one adjustable pivot arm, wherein said means for pushing extends outwardly in a straight forward motion parallel to said platform base.

11. The hand truck unloading apparatus of claim 10, wherein said means for pushing is a bar.

12. The hand truck unloading apparatus of claim 10, wherein said means for pushing is a roller.

13. The hand truck unloading apparatus of claim 10, wherein said at least one leg member is adjustable in length.

14. The hand truck unloading apparatus of claim 10, wherein said at least one side arm is adjustable in length.

15. The hand truck unloading apparatus of claim 10, including a means for biasing said unloading apparatus in a stationary position.

16. The hand truck unloading apparatus of claim 15, wherein said means for biasing is a spring attaching said support member to said side rail.

17. The hand truck unloading apparatus of claim 10, wherein said at least one side arm and said at least one leg member are integral.

18. The hand truck unloading apparatus of claim 10, wherein said central support depression member extends less away from said frame less distance than said wheel assembly.

* * * * *